United States Patent
Bierhuizen (10) Patent No.: US 7,131,736 B2
(45) Date of Patent: Nov. 7, 2006

(54) EFFICIENT ILLUMINATION SYSTEMS FOR REDUCED ÉTENDUE COLOR VIDEO PROJECTION SYSTEMS

(76) Inventor: Serge J. A. Bierhuizen, P.O. Box 1726, Santa Rosa, CA (US) 95402

(*) Notice: Subject to any disclaimer, the term of this patent is extended or adjusted under 35 U.S.C. 154(b) by 0 days.

(21) Appl. No.: 10/677,201

(22) Filed: Oct. 1, 2003

(65) Prior Publication Data
US 2004/0070842 A1   Apr. 15, 2004

Related U.S. Application Data

(63) Continuation-in-part of application No. 10/150,527, filed on May 17, 2002, now Pat. No. 6,839,095.

(51) Int. Cl.
G03B 21/28 (2006.01)
F21V 7/09 (2006.01)
F21V 7/04 (2006.01)
G02F 1/13357 (2006.01)

(52) U.S. Cl. .................. 353/98; 353/102; 362/560; 362/561; 362/346; 349/62

(58) Field of Classification Search ............... 353/20, 353/28, 30, 31, 33, 37, 85, 97, 98, 102; 349/57, 349/58, 67, 62; 362/560, 561, 346–349
See application file for complete search history.

(56) References Cited

U.S. PATENT DOCUMENTS

| | | | |
|---|---|---|---|
| 5,414,600 A | 5/1995 | Strobl et al. | |
| 5,707,131 A | 1/1998 | Li | |
| 5,829,858 A | 11/1998 | Levis et al. | |
| 5,967,636 A | 10/1999 | Stark et al. | |
| 6,005,722 A * | 12/1999 | Butterworth et al. | 359/712 |
| 6,025,890 A | 2/2000 | Chase | |
| 6,034,818 A | 3/2000 | Sedlmayr | |
| 6,111,618 A * | 8/2000 | Booth et al. | 349/5 |
| 6,227,682 B1 | 5/2001 | Li | |
| 6,243,152 B1 | 6/2001 | Knox et al. | |
| 6,327,093 B1 | 12/2001 | Nakanishi et al. | |
| 6,362,922 B1 | 3/2002 | Tadic-Galeb et al. | |
| 6,388,718 B1 | 5/2002 | Yoo et al. | |
| 6,390,626 B1 | 5/2002 | Knox | |
| 6,476,880 B1 | 11/2002 | Tsujikawa | |
| 6,527,420 B1 * | 3/2003 | Chuang | 362/346 |
| 6,587,269 B1 * | 7/2003 | Li | 359/497 |
| 6,619,820 B1 * | 9/2003 | Li | 362/302 |
| 6,739,726 B1 * | 5/2004 | Li | 353/98 |
| 2002/0176054 A1 * | 11/2002 | Mihalakis | 353/31 |

FOREIGN PATENT DOCUMENTS

WO    WO 01/75492 A2    10/2001

* cited by examiner

*Primary Examiner*—W. B. Perkey
*Assistant Examiner*—Andrew Sever
(74) *Attorney, Agent, or Firm*—Berkeley Law & Technology Group, LLC (57) ABSTRACT

An illumination system is provided with at least a first reflecting device that has a first focal point at the arc of an arc lamp. The second focal point of the reflecting device is located at the input end of a compound parabolic concentrator (CPC). The CPC is optically coupled with an optical integrator. Light exiting the optical integrator may be used in low étendue projection systems.

37 Claims, 4 Drawing Sheets

EFFICIENT ILLUMINATION SYSTEMS FOR REDUCED ÉTENDUE COLOR VIDEO PROJECTION SYSTEMS

RELATED APPLICATION

This application is a continuation-in-part of application Ser. No. 10/150,527 for SINGLE-PATH COLOR VIDEO PROJECTION SYSTEMS EMPLOYING REFLECTIVE LIQUID CRYSTAL DISPLAY DEVICES.

FEDERALLY SPONSORED RESEARCH OR DEVELOPMENT

Not applicable

TECHNICAL FIELD

This invention relates to color video projection systems and more particularly to illumination systems suitable for use in such systems with low étendue.

BACKGROUND OF THE INVENTION

Multimedia projection systems have become popular for purposes such as conducting sales demonstrations, business meetings, classroom training, and for use in home theaters. In typical operation, multimedia projection systems receive analog video signals from a video unit and convert the video signals to digital information to control one or more digitally driven light valves. Depending on the cost, brightness, and image quality goals of the particular projection systems, the light valves may be of various sizes and resolutions, be transmissive or reflective, and be employed in single or multiple light path configurations. (Hereinafter, projection systems may also be referred to as "projectors.")

Optimized sets of multimedia projector characteristics have been achieved by employing reflective light valves, the most common types of these reflective light valve optical arrangements are deflected mirror arrays and reflective liquid crystal light valves. Deflected mirror arrays are very efficient reflectors that do not require polarizers for operation. However, they are quite expensive, require off-axis illumination, and often employ unusual optical elements, such as specialized prisms, to compensate for the off-axis light path angles generated.

Reflective liquid crystal light valves are typically fabricated on a silicon substrate and are, therefore, referred to as liquid crystal on silicon ("LCOS") light valves. They are much less expensive than reflected mirror devices, but require specialized polarizers for operation, which results in significant light transmission losses.

LCOS light valve-based projector architectures employ linear polarized light-sensitive devices for receiving light from a randomly polarized light source, reflecting the light off the light valves, and redirecting the reflected light, depending on its polarization direction or state, either out through a projection lens or back toward the light source. The polarization state of the light is determined by an electronic image pattern applied to the light valve.

There are several different optical architectures for employing LCOS light valves. One variation is a multi-path optical architecture that provides a separate path for each of the primary color (red, blue, and green) lights. The different color lights are routed through a series of polarization beam splitters, filters, and wave plates to a color-specific reflective LCOS light valve. Polychromatic light is optically divided to provide each of the three pathways with its associated color light. A light valve, which is provided in each pathway, is modulated with its respective color data. The individual pathways are then recombined into a converged projected color image. Another variation is a single-path multimedia projector that typically includes a color wheel-based frame-sequential color ("FSC") optical arrangement. In this arrangement, polychromatic light rays emitted by a light source are directed through the color filter segments of the color wheel. The resulting FSC light travels along a single light path that color timeshares a single light valve.

The multi-path optical architecture generally provides an increased image brightness compared to the single-path architecture. Image brightness is also a function of the amount of collected light from the lamp and the color efficiency, which is generally lower for the single-path architecture. Nevertheless, the single-path architecture is generally preferred because the resulting systems tend to be lighter weight, lower cost, and more compact in size. All of these factors can be further improved if the light produced by the lamp (light source) can be collected efficiently and propagated through the optical components optimized for a low étendue, which enables using reduced-size optical components.

Figure 1:
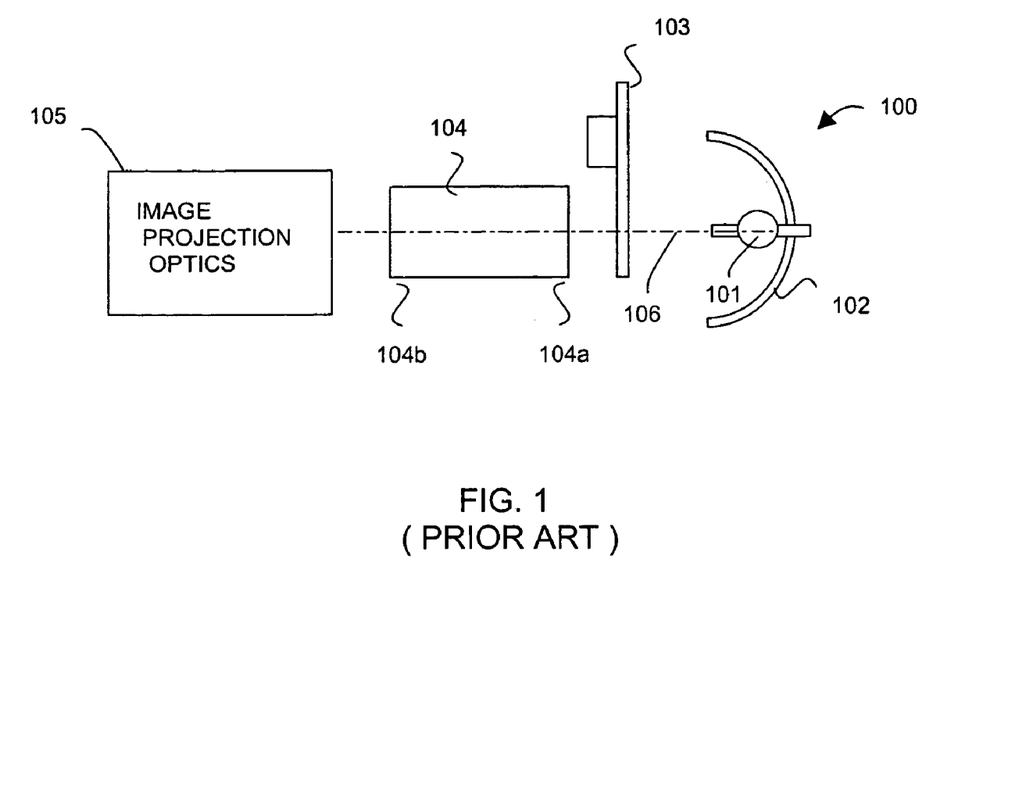
FIG. 1 is a simplified pictorial plan view of a prior art multimedia projector system using a standard conic reflector.
Figure 2:
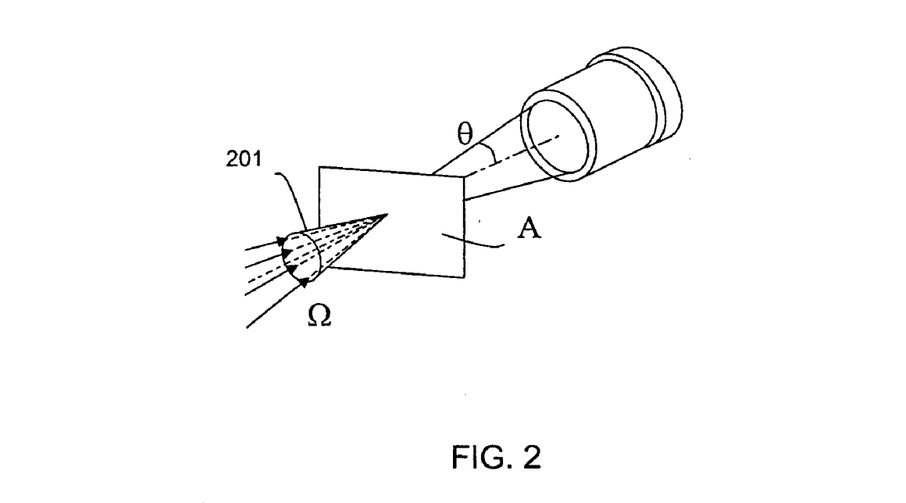
FIG. 2 is a simplified pictorial representation of parameters defining the étendue of a light ray bundle.
Figure 3:
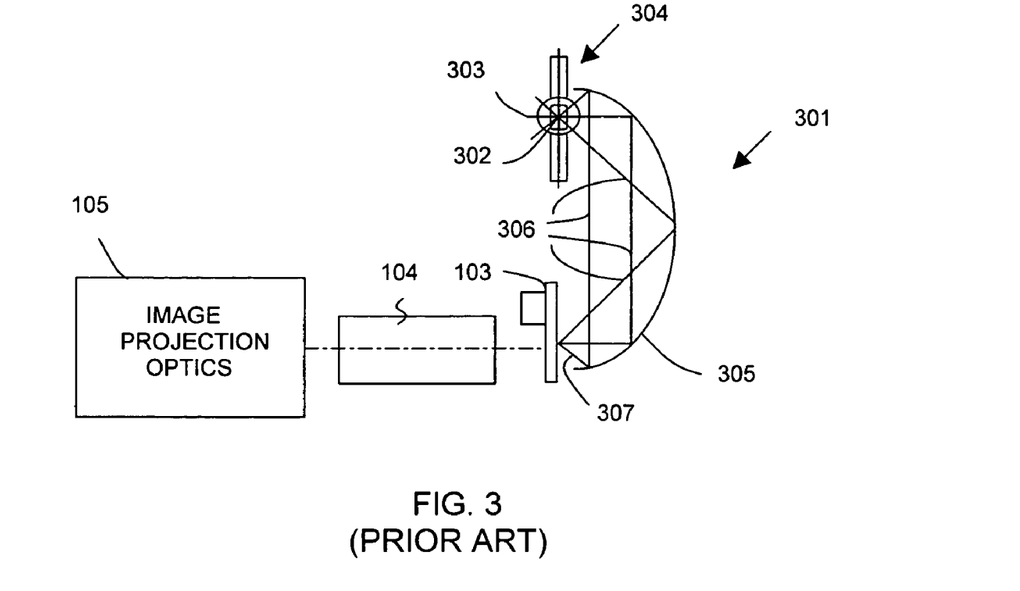
FIG. 3 is a simplified pictorial plan view of a prior art multimedia projector system using an off-axis arc lamp in conjunction with a double-parabolic reflector.

FIGS. 1–3 illustrate these problems in further detail. In particular, FIG. 1 shows a prior art conventional light source 100 used in conjunction with a single-path architecture multimedia projection system. The light source includes an arc lamp 101 mounted at a focus of an elliptical reflector 102. Polychromatic light rays emitted by arc lamp 101 are converged by elliptical reflector 102 to propagate along optical axis 106 through color filter segments of color wheel 103 and optical integrator 104. Color wheel 103 typically includes R, G, B, and light-purplish filter segments. Because the light from arc lamp 101 is typically greenish (deficient in red), the light-purplish (nonwhite) filter segment produces a more accurate white color point and overall color gamut for the multimedia projector. In some multimedia projectors, the color wheel 103 is replaced with other types of color modulators, such as a liquid crystal-based color switcher. For projectors with architecture of a multi-path type, the color modulator is not employed, and polychromatic light propagates directly through the image projection optics. After the FSC light passes through the color wheel 103 (single-path architecture), it passes through an optical integrator before it enters the remaining components of an image projection system 105. The optical integrator 104 is typically an elongated tunnel-type integrator with squared-off flat inlet 104a and outlet 104b ends.

One of the functional purposes of an illumination system is to output a large amount of light energy. However, the emitted light energy is restricted by constraints on the physical dimensions of the light source as well as the amount of light acceptable by downstream optical components. The amount of light that is acceptable to an optical component is a function of its area and the light flux throughput, or étendue. The geometric entity, étendue E, is defined as the product of the transverse sectional area of a light beam and the divergence angle of the beam. Étendue is also referred to as geometric extent.

Referring to FIG. 2, étendue E is a geometric entity that is represented mathematically by Eq. 1:

$$E = \int\int \cos(\Phi) dA d\Omega = A\Omega = A\pi\sin^2(\theta) = \frac{A\pi}{4(f/\#)^2}$$

where $\Omega$ defines a cone of light 201 diverging through a cross-sectional area A.

Étendue is important because in an optical system it cannot be reduced without a corresponding reduction in light flux. It is of particular importance in the efficient collection of light flux from a light source, such as light source 100, which effectively establishes the lower limit of étendue for the entire optical system.

An illumination system that uses the single on-axis elliptical reflector, as illustrated in FIG. 1, or an on-axis parabolic reflector (not shown), has an intrinsic variation of "magnification-over-angle" that degrades the étendue of the light, thus degrading the output from the illumination source.

FIG. 3 shows one attempted solution to this fundamental limitation of traditional conic reflector arrangements. In particular, light source 301 employs a double-paraboloid reflector 305 having first and second focal points 302 and 307. Light rays are produced by an arc lamp 304 that has its arc located at first focal point 302 of double-paraboloid reflector 305. Arc lamp 304 also includes a mirror coating 303 on its surface facing away from double-paraboloid reflector 305 to reflect light rays 306 back through the arc to join with and further intensify light rays. This light source 301 achieves suitable light-collecting efficiency (greater than about 40%) at a desirable étendue (less than 7 mm²·sr). However, a disadvantage of this light source is that the angles coming off of the second reflection are too steep to be fully utilized by downstream optical components. This stray light reduces the efficiency of the illumination system.

What is still needed, therefore, is an illumination system which achieves a suitable light-collecting efficiency at a small étendue. Such an illumination system would be advantageous in designing a compact, lightweight, and/or low-profile multimedia projection system that achieves a bright and/or high-quality projected image at preferably a relatively low cost.

DETAILED DESCRIPTION OF EMBODIMENTS OF THIS INVENTION

The present invention includes, but is not limited to, an illumination system that achieves a suitable light-collecting efficiency for use in multimedia projection systems with small étendue. The design and advantages of the present invention will become apparent from the detailed description of various embodiments given hereinafter. However, it should be understood that the detailed description and specific examples are given by way of illustration only, and are not restrictive. Various modifications within the scope of this invention will become apparent to those skilled in the art from the detailed description of the various embodiments.

The design and advantages of the embodiments described herein are applicable to single- and multi-path optical architectures employing any of various reflective or transmissive light valve types as well as prism-based and non-prism-based optical path architectures. In particular, significant advantages are achieved in reduced étendue color video projection systems.

Figure 4:
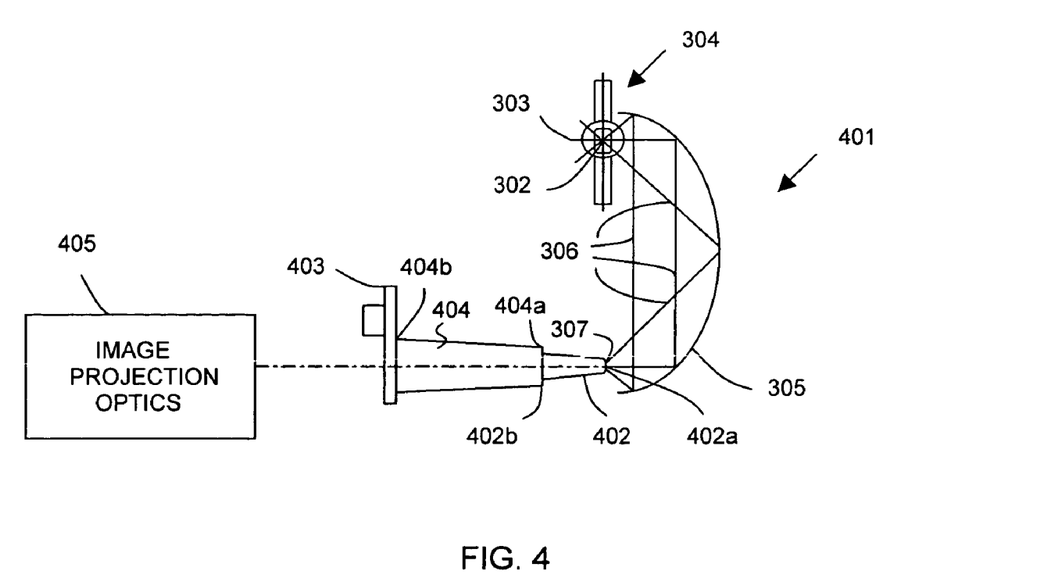
FIG. 4 is a simplified pictorial plan view of an off-axis arc lamp used with a double-parabolic reflector optimized for use in multimedia projection systems with small étendues, in accordance with one embodiment of the present invention.
Figure 5:
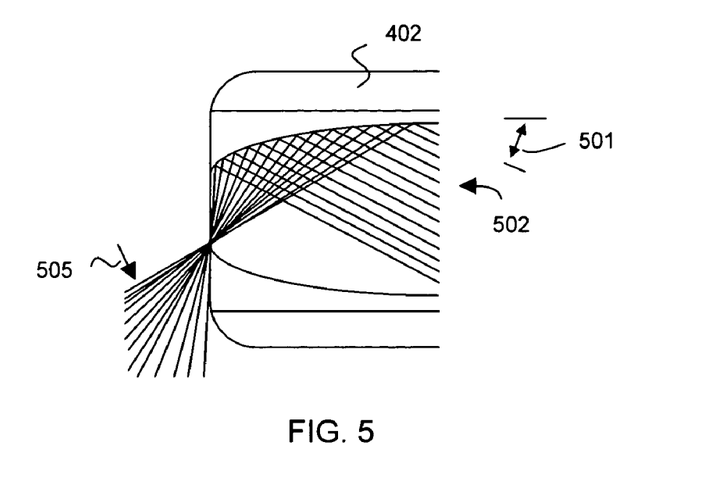
FIG. 5 is a simplified pictorial cross-sectional view showing ray tracings through a compound parabolic concentrator, such as the one shown in FIG. 4.

FIG. 4 shows an embodiment of the present invention. The illumination system of FIG. 3 is advantageously used in conjunction with a novel two-step process to concentrate and integrate the light rays coming from the light source in order to optimize efficiency for low étendue systems 401. A compound parabolic concentrator ("CPC") 402 is positioned with input end 402a at second focal point 307 of double-paraboloid reflector 305. Referring to FIG. 5, light rays may enter CPC 502 over a wide range of acceptance angles (up to, e.g., 90°) 501, but may exit with a relatively small and constant exit angle (e.g., 30° or less) 505 with a very small amount of reflections. From the output of the CPC 402b the light is then passed through an optical integrator 404. The optical integrator 404 used in this embodiment is a solid glass light-integrating tunnel having an input aperture 404a and an output aperture 404b. The light-integrating tunnel 404 operates by total internal reflection and may have a tapered cross-sectional area to suit particular applications. Input aperture 404a may include a mirrored surface. Output aperture 404b may have an aspect ratio that matches the "downstream" light valve (not shown) aspect ratio. Although this embodiment describes a glass rod integrator, other embodiments of this invention may use a double flyseye lens integrator or any other sufficiently effective integration device that provides a substantially uniform light distribution upon exiting the integrator.

In various embodiments, outlet apertures of optical integrator 404b have cross-sectional aspect ratios that provide a projection display format that is compatible with conventional display standards. Some examples of display standards include SVGA (Super Video Graphics Array), XGA (Extended Graphics Array), SXGA (Super XGA), UXGA (Ultra XGA), and WUXGA (Widescreen Ultra XGA). These display standards are often a combination of resolution, color depth measured in bits, and refresh rate measured in hertz. SVGA, XGA, and UXGA all have aspect ratios of 4:3;

that is, the ratio between the width and the height of the image. SXGA has an aspect ratio of 5:4, and WUXGA is 16:10.

Substantially uniformly distributed light exiting output aperture 404b propagates through an optional color wheel 403 and enters image projection optics 405, such as, but not limited to, optics of the single or multi-path optical architectures discussed above.

The illumination system of FIG. 4 is advantageous because it provides increased light collection efficiency at small étendues, which allows a suitably fast optical system while employing smaller and, therefore, less costly optical components, most notably color wheel, transflective polarizing beam splitter, LCD (e.g., a 1.27 centimeter (0.5 inch) LCD may be employed), and projection lens. Small optical components are particularly useful for producing compact, lightweight portable projectors.

Figure 6:
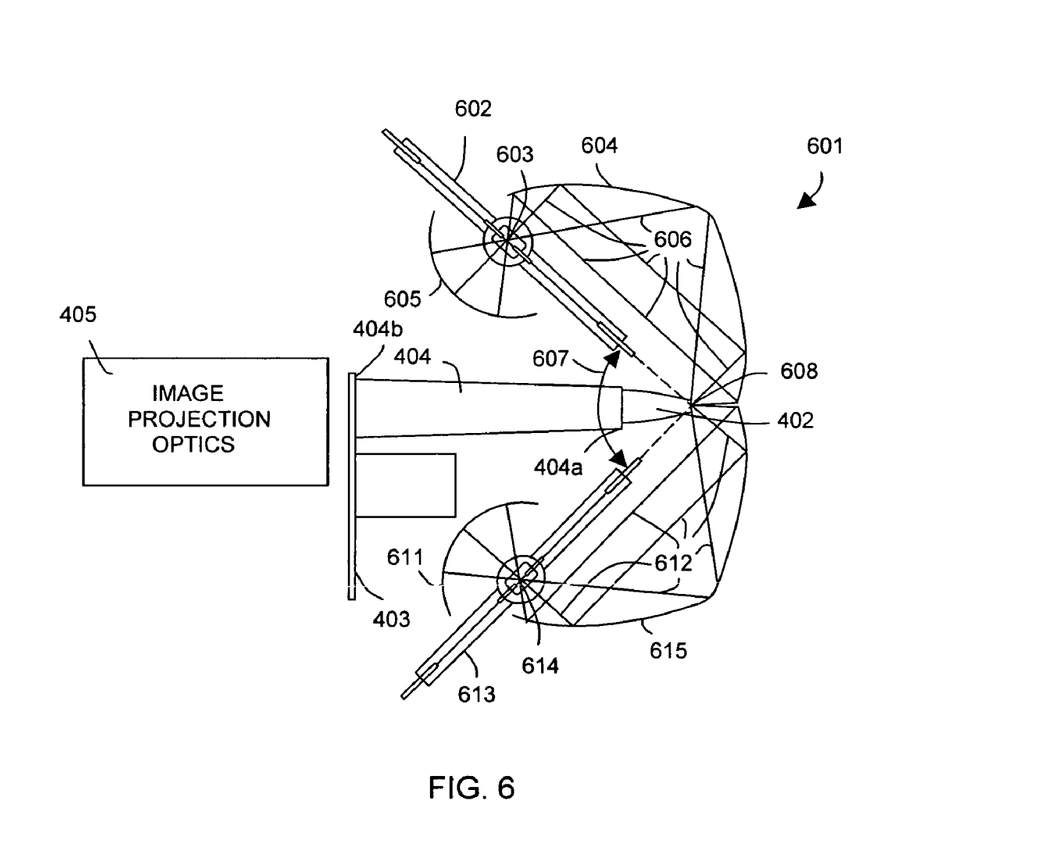
FIG. 6 is a simplified pictorial plan view of a light source of another embodiment of this invention showing light rays from dual arc lamps reflecting off associated reflectors, through a compound parabolic concentrator, light-integrating tunnel, and a color wheel for improved illumination efficiency of an optical system at small étendues, in accordance with one embodiment.

FIG. 6 shows another embodiment of this invention. This embodiment overcomes additional prior art limitations, namely the 1:1 imaging of the arc, which is limited in one direction to ±90° angles and in an orthogonal direction to ±45° angles. Furthermore, this embodiment provides improved brightness, illumination uniformity, and illumination efficiency for optical systems including those having small étendues and/or employing size-limited optical components that are étendue limited. For the embodiment, light source 601 employs two arc lamps 602 and 613 and associated reflector systems 604 and 615 offset at a 90° angle and positioned such that their second focal points coincide 608. This arrangement superimposes the two arc lamp images at the second focal points and provides a ±90° angular distribution 607 in both orthogonal axes.

In particular, light source 601 employs first and second free-form, double-ellipsoid, or preferably double-paraboloid reflectors 604 and 615 having respective first focal points 603 and 614, and coincident second focal points 608. Light rays 606 are produced by a first arc lamp 602 that has its arc located at first focal point 603 of double-paraboloid reflector 604. Likewise, light rays 612 are produced by a second arc lamp 613 that has its arc located at first focal point 614 of double-paraboloid reflector 615.

First and second arc lamps 602 and 613 may also include mirror coatings on their surfaces facing away from associated reflectors 604 and 615 to reflect light rays 606 and 612 back through the respective arcs to join with and further intensify light rays 606 and 612. However, the mirror coating may be alternatively or additionally provided to first and second spherical reflectors 605 and 611 placed adjacent to respective first and second arc lamps 602 and 613.

As mentioned above, first and second reflectors 604 and 615 are substantially offset at about a 90° offset angle 607, which is the angle between imaginary lines extending from second focal points 608 to first focal points 603 and 614.

Light source 601 further includes a two-stage light ray angle conversion and integration system. The first stage includes a CPC, such as CPC 402 (FIGS. 4 and 5) that converts the substantially ±90° angular distribution of the arc images into, e.g., a substantially ±30° degree light ray angular distribution with the very low amount of required reflections. The second stage includes a solid glass light-integrating tunnel 404 having an input aperture 404a and an output aperture 404b. Light-integrating tunnel 404 operates by total internal reflection and may have a tapered cross-sectional area to suit particular applications. Input aperture 404a may include a mirrored surface. Output aperture 404b may have an aspect ratio that matches the "downstream" light valve (not shown) aspect ratio.

Uniformly distributed light exiting output aperture 404b propagates through an optional color wheel 403 and enters image projection optics 405, such as, but not limited to, the projection optics described above. As described above, color wheel may not be necessary if image projection optics were based on multipath optical architecture. In that case, the polychromatic light exiting light-integrating tunnel 404 would be propagated directly into image projection optics 405.

Tables 1–7 show component parameters for one embodiment, and accompanying calculated optical system parameters for light source 601.

TABLE 1

Arc Lamp 602 and 613 Arc Dimensions

| | |
|---|---|
| arc length | 1 mm |
| arc width | 0.6 mm |

TABLE 2

Arc Image Parameters at CPC 402 Input

| | |
|---|---|
| ray width angle | 90° |
| ray height angle | 90° |
| width | 1.5 mm |
| height | 1 mm |
| area | 1.5 mm$^2$ |
| étendue | 4.712389 mm$^2$ · sr |

TABLE 3

CPC 402 Output Parameters

| | |
|---|---|
| ray width angle | 30° |
| ray height angle | 30° |
| width | 3 mm |
| height | 2 mm |
| area | 6 mm$^2$ |
| étendue | 4.712389 mm$^2$ · sr |

TABLE 4

Ratio of CPC 402 Output Area to Integrator 404 Input Area

| | |
|---|---|
| integrator input area | 30.16128 mm$^2$ |
| CPC output area | 6 mm$^2$ |
| ratio | 5.026881 |

TABLE 5

Integrator 404 Input Parameters

| | |
|---|---|
| cone angle | 30° |
| étendue | 23.68862 mm$^2$ · sr |
| input aperture area | 30.16128 mm$^2$ |
| input diagonal | 7.926917 mm |
| input width | 6.341533 mm |
| input height | 4.75615 mm |

TABLE 6

Integrator 404 Output Parameters

| | |
|---|---|
| cone angle | 26.5° |
| étendue | 23.68862 mm$^2$ · sr |

TABLE 6-continued

Integrator 404 Output Parameters

| | |
|---|---|
| output aperture area | 37.87346 mm² |
| output diagonal | 8.88738 mm |
| output width | 7.106191 mm |
| output height | 5.329643 mm |

TABLE 7

Light Valve Illumination Parameters

| | |
|---|---|
| light valve diagonal | 17.78 mm |
| | (0.7 inches) |
| illumination overfill | 7% |
| illumination area | 173.729 mm² |
| f/# | 2.4 |
| illumination angle | 12.0247° |
| étendue | 23.68862 mm²·sr |

Employing the two-stage light ray angle conversion and integration system is advantageous because CPC 402 has a substantially ±90° acceptance angle, whereas using integrator tunnel 404 alone would cause considerable Fresnel losses. CPC 402 reduces the angles to about ±30°, which are compatible with the acceptance angle of light integrator tunnel 404.

Employing the two-stage light ray angle conversion and integration system is further advantageous because it increases the ratio of the integrator input aperture area to the CPC output area, thereby increasing the effective recoupled color efficiency.

Optically combining multiple lamps generally increases the étendue. However, light source 601 is advantageous because it provides a two-lamp system while maintaining a low étendue.

Two-lamp light source 601 has additional advantages including increased brightness and color uniformity, increased average lifetime before system breakdown, increased reliability, lamp selection, and the ability to select one or two lamps to effect brightness changes.

Figure 7:
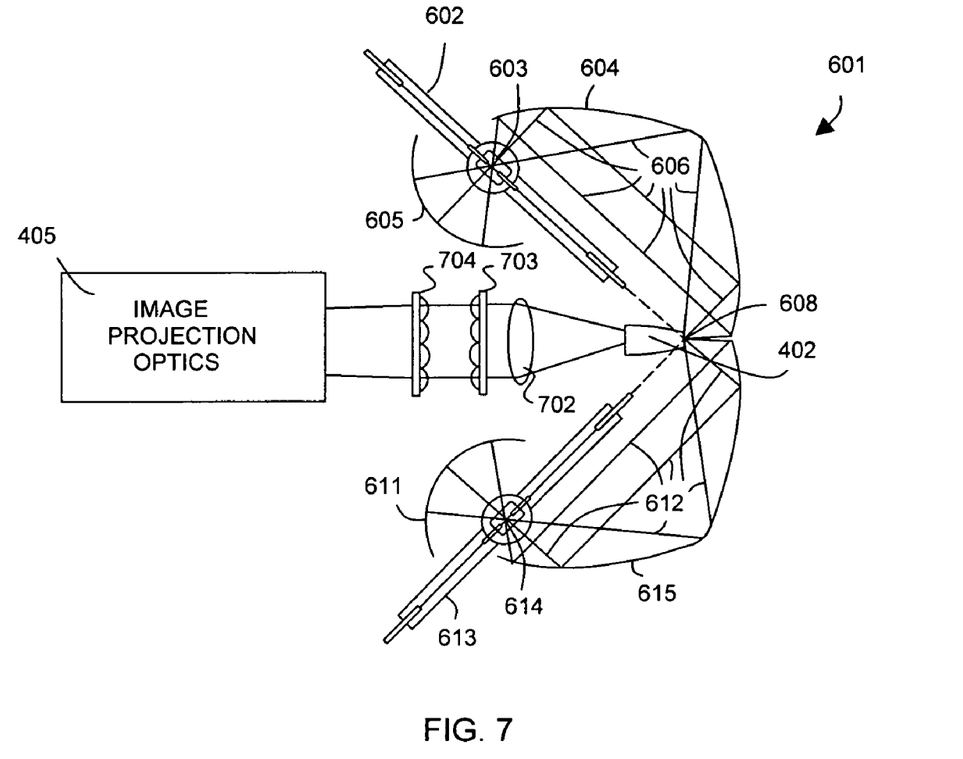
FIG. 7 is a simplified pictorial plan view of a light source showing light rays from dual arc lamps reflecting off associated reflectors, through a compound parabolic concentrator, collimating lens, and a double flyseye lens integrator, in accordance with one embodiment.

FIG. 7 shows another embodiment of this invention. In this embodiment the solid glass light-integrating tunnel 404 is replaced with first and second flyseye lenses 703 and 704. Because flyseye lenses tend to work better with collimated light, an optional collimating lens 702 is placed prior to the integrator. Otherwise the image projection functionality of this embodiment is substantially the same as the FIG. 6 embodiment.

Figure 8:
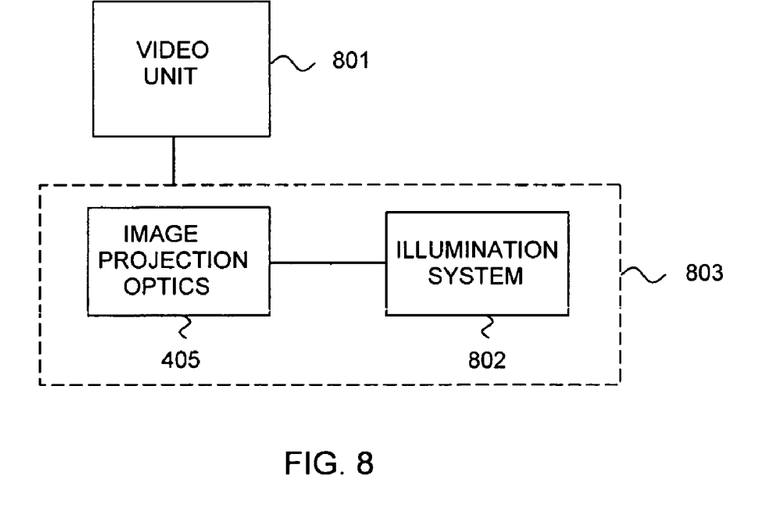
FIG. 8 is a simplified pictorial plan view of a video projection system showing a video unit coupled to a projection system that includes image projection optics and an illumination system, in accordance with one embodiment.

FIG. 8 shows another embodiment of this invention. In this embodiment a video unit 801 transmits video signals to the projection system 803, which includes image projection optics 405 and an illumination system 802. The illumination system may be any one of the various embodiments described under the teachings of this invention. In one embodiment the image projection optics 405 may be comprised of a reflective LCOS light valve optical arrangement. The video unit 801 may include a personal or laptop computer, DVD, set-top box (STB), video camera, video recorder, or any other suitable device to transmit video signals to the projector.

Advantages of the multimedia projectors of this invention include but are not limited to lighter weight, smaller size, fewer and/or less costly components, and/or easier implementations than alternative approaches. The projectors of this invention are lighter weight partly because prisms are not necessarily required or, because of the small étendues made possible by light sources incorporated with teachings of the present invention, much smaller prisms may be employed to obtain the same light transmission efficiency.

Moreover, there are possible performance advantages. The projectors of this invention may offer higher image contrast because transflective polarizing beam splitters and small prisms may reduce birefringence issues, which are typically caused by residual or thermally induced stresses within large glass prisms. Finally, embodiments of this invention enable implementing optical projectors having a faster f/#, resulting in possible higher luminous efficiency and more lumens (brightness) on the screen. This is possible because of the higher light collection efficiency at small étendues. For example, prior glass prisms were limited by optical coating designs to about f/2.5. However, the small étendues projection systems incorporated with teachings of this invention may use prisms at about f/2.0.

Skilled workers will recognize that various other portions of this invention may be implemented differently from the implementations described above for preferred embodiments. For example, minor optical path variations and additions may be made to correct for astigmatism, color aberrations, and other optical distortions. Also, the wavelength ranges, filters, wave plates, and other optical components may employ a wide variety of characteristics, mounting positions, spacings, dimensions, and aspect ratios that are suited to particular displays, such as rear projection, higher resolution, video only, and entertainment applications. UV and/or IR filters may be employed to protect components from damaging heat and radiation. The light source and illumination system embodiments may be used with multipath optical architectures as well as the single-path systems shown and described. Light source 601 can also be optimized for a single-lamp system by reducing the output dimensions of CPC 402 by a factor of two in one direction. This enables employing even smaller optical components and light valves. Light source 601 can also be configured to operate with more than two lamps. Finally, the single-path embodiments are described with reference to G, R, B, and purplish colors, but embodiments of the present invention may be readily adaptable to monochrome, gray scale, and other color systems.

Many other changes may also be made to the details of the above-described embodiments of this invention without departing from the underlying principles thereof. The scope of this invention should, therefore, be determined only by the following claims.

What is claimed is:

1. A light source apparatus, comprising:
   at least a first reflecting device having first and second focal points;
   at least a first arc lamp having a first arc located at about the first focal point of the first reflecting device, the first arc lamp capable of producing first light rays;
   a compound parabolic concentrator having input and output ends, the input end located at approximately the second focal point of the first reflecting device to receive the first light rays at the input end over a first range of acceptance angles and to emit the first light rays from the output end with a second range of exit angles, the second range being smaller than the first range, wherein the first light rays exit the compound parabolic concentrator with an étendue less than about 7 mm²·sr; and
   an optical integrator having an input aperture positioned to receive the first light rays from the output end of the compound parabolic concentrator, and an output aperture from which the first light rays are capable of exiting with a substantially uniform brightness.

2. The apparatus of claim 1, further including a first substantially spherical reflector positioned approximately adjacent to the first arc lamp to receive a portion of the first light rays and reflect them back through the first arc.

3. The apparatus of claim 2, wherein the first substantially spherically reflector includes a mirror coating applied to at least a portion of the first arc lamp.

4. The apparatus of claim 1, wherein the first reflecting device comprises a device selected from a group comprising a free-form reflector, a double-ellipsoid reflector, and/or a double-paraboloid reflector.

5. The apparatus of claim 1, wherein the optical integrator comprises a glass rod integrator.

6. The apparatus of claim 5, wherein the glass rod integrator is tapered such that the cross-sectional area of the input end is less than the cross sectional area of the output end.

7. The apparatus of claim 1, further comprising:
a second reflecting device having first and second focal points, the second reflecting device positioned such that the second focal points of the first and second reflecting devices are substantially coincident;
a second arc lamp having a second arc located at approximately the first focal point of the second reflecting device, the second arc lamp capable of producing second light rays, the compound parabolic concentrator capable of receiving the second light rays at the input end over a third range of acceptance angles and capable of emitting the second light rays from the output end with a fourth range of exit angles, the fourth range being smaller than the third range; and
the optical integrator input aperture positioned to receive the second light rays from the output end of the compound parabolic concentrator, and capable of emitting the second light rays from the output aperture with a substantially uniform brightness.

8. The apparatus of claim 7, wherein the first and second reflecting devices comprises a device selected selected from a group comprising a free-form reflector, a double-ellipsoid reflector, and/or a double-paraboloid reflector.

9. The apparatus of claim 7, wherein the first and second reflectors are relatively positioned such that a pair of lines extending from the coincident second focal points to the first focal points form approximately a 90° angle.

10. The apparatus of claim 7, wherein the light rays enter the compound parabolic concentrator with ray angles of up to about 90° and exit the compound parabolic concentrator with ray angles of about 30° or less.

11. The apparatus of claim 7, wherein the ratio of the integrator input area to the compound parabolic concentrator output area is approximately 5:1.

12. The apparatus of claim 7, wherein the optical integrator comprises a glass rod integrator.

13. The apparatus of claim 12, wherein the glass rod integrator is tapered such that the cross-sectional area of the input end is less than the cross sectional area of the output end.

14. The apparatus of claim 7, in which the optical integrator comprises a double flyseye lens integrator.

15. A projection system, comprising:
an illumination system comprising
at least a first reflecting device having first and second focal points;
at least a first arc lamp having a first arc located at about the first focal point of the first reflecting device, the first arc lamp capable of producing first light rays;
a compound parabolic concentrator having input and output ends, the input end located at approximately the second focal point of the first reflecting device to receive the first light rays at the input end over a first range of acceptance angles and to emit the first light rays from the output end with a second range of exit angles, the second range being smaller than the first range wherein the first light rays exit the compound parabolic concentrator with an étendue less than about 7 $mm^2 \cdot sr$; and
an optical integrator having an input aperture positioned to receive the first light rays from the output end of the compound parabolic concentrator, and an output aperture from which the first light rays exit with a substantially uniform brightness;
a light valve optical arrangement optically coupled to the illumination system; and
a projection lens optically coupled to the light valve optical arrangement.

16. The projection system of claim 15, wherein the light valve optical arrangement comprises liquid crystal on silicon light valves.

17. The projection system of claim 15, wherein the light valve optical arrangement comprises a frame sequential color projection display and wherein the illumination system further includes a color wheel positioned approximately adjacent to the optical integrator.

18. The projection system of claim 15, wherein the aspect ratio of the output aperture substantially matches the aspect ratio of a light valve in the light valve arrangement.

19. The projection system of claim 15, wherein the illumination system further comprises
a second reflecting device having first and second focal points, the second reflecting device positioned such that the second focal points of the first and second reflecting devices are substantially coincident;
a second arc lamp having a second arc located at approximately the first focal point of the second reflecting device, the second arc lamp capable of producing second light rays, the compound parabolic concentrator input end to receive the second light rays at the input end over a third range of acceptance angles and to emit the second light rays from the output end with a fourth range of exit angles, the fourth range being smaller than the third range; and
the optical integrator input aperture positioned to receive the second light rays from the output end of the compound parabolic concentrator, and to emit the second light rays from the output aperture with substantially uniform brightness.

20. A projection system, comprising:
an illumination system comprising first and second reflecting devices having respective first and second focal points, positioned such that the second focal points of the first and second reflecting devices are substantially coincident, the illumination system further comprising a compound parabolic concentrator having input and output ends, the input end located at approximately the coincident second focal points of the first and second reflecting devices to receive first and second light rays over a first range of acceptance angles and to emit the first and second light rays from the output end with a second range of exit angles, the second range being smaller that the first range, wherein the first light rays exit the compound parabolic concentrator with an étendue less than about 7 mm²·sr;

first and second arc lamps associated respectively with the first and second reflecting devices capable of producing respective said first and second light rays; and each arc lamp having an arc located at about the first focal point of the corresponding reflecting device;

a light valve optical arrangement optically coupled to illumination system; and a projection lens optically coupled to light valve optical arrangement.

21. The projection system of claim 20, wherein the light valve optical arrangement comprises a liquid crystal on silicon light valve.

22. The projection system of claim 20 wherein the light valve optical arrangement comprises a frame sequential color projection display and the illumination system further includes a color wheel positioned approximately adjacent to the optical integrator.

23. A method for providing illumination, comprising:

generating light rays from at least a first arc lamp having a first arc;

reflecting said light rays with at least a first reflecting device having a first and second focal points, the first reflecting device being positioned with the first focal point substantially coincident with the first arc of the first arc lamp;

receiving said light rays, at an input end of a compound parabolic concentrator, over a first range of acceptance angles;

emitting said light rays, from an output end of the compound parabolic concentrator, with a second range of exit angles, the second range being smaller than the first range wherein the light rays exit the compound parabolic concentrator with an étendue less than about 7 mm²·sr; and integrating said light rays with an optical integrator.

24. The method of claim 23, further comprising reflecting a portion of the light rays back through the first arc with a first substantially spherical reflector adjacent to the first arc lamp.

25. The method of claim 23, wherein said reflecting with at least a first reflecting device comprises reflecting the light rays with a reflector selected from a group comprising a free-form reflector, a double-ellipsoid reflector, and/or a double-paraboloid reflector.

26. The method of claim 23, further comprising:

positioning a second reflecting device having first and second focal points, such that the second focal points of the first and second reflecting devices are substantially coincident;

generating second light rays from a second arc lamp having a second arc located at approximately a first focal point of a second reflecting device;

reflecting the second light rays with the second reflecting device towards a second focal point of the second reflecting device;

receiving the second light rays at the input end of the compound parabolic concentrator over a third range of acceptance angles; and emitting the second light rays from the output end of the compound parabolic concentrator with a fourth range of exit angles, the fourth range being smaller that the third range.

27. The method of claim 26, wherein said reflecting with first and second reflecting devices comprises reflecting the light rays with reflectors selected from a group comprising a free-form reflector, a double-ellipsoid reflector, and/or a double-paraboloid reflector.

28. A light source apparatus, comprising:

first and second reflecting devices having respective first and second focal points, positioned such that the second focal points are substantially coincident;

first and second arc lamps associated respectively with the first and second reflecting devices capable of producing respective first and second light rays, each arc lamp having an arc located at approximately the first focal point of the respective first and second reflecting devices; and a compound parabolic concentrator having input and output ends, the input end located at approximately the second focal point of the first and second reflecting devices to receive the first and second light rays over a first range of acceptance angles and to emit the first and second light rays from the output end with a second range of exit angles, the second range being smaller that the first range, wherein the first and second light rays exit the compound parabolic concentrator with an étendue less than about 7 mm²·sr.

29. The apparatus of claim 28 wherein the light rays enter the compound parabolic concentrator with ray angles of up to about 90° and exit the compound parabolic concentrator with ray angles of about 30° or less.

30. The apparatus of claim 28, further including first and second substantially spherical reflectors, positioned adjacent to respective arc lamps and capable of receiving a portion of the respective light rays and reflecting them back through the respective arcs.

31. The apparatus of claim 30, wherein the first and second substantially spherical reflectors include a mirror coating applied to a portion of the arc lamps.

32. The apparatus of claim 28, wherein the first and second reflecting devices include reflectors selected from the group comprising a free-form reflector, a double-ellipsoid reflector, and/or a double-paraboloid reflector.

33. A method for providing illumination, comprising:

generating first and second light rays from first and second arc lamps, the first arc lamp positioned on or about a first focal point of a first reflecting device and the second arc lamp positioned on or about a first focal point of a second reflecting device;

reflecting the first light rays toward a second focal point of the first reflecting device;

reflecting the second light rays toward a second focal point of the second reflecting device, which is substantially coincident with the second focal point of the first reflecting device;

receiving said first and second light rays at an input end of a compound parabolic concentrator over a first range of acceptance angles; and emitting said first and second light rays from an output end of the compound parabolic concentrator with a second range of exit angles, the second range being smaller than the first range, wherein the first light rays exit the compound parabolic concentrator with an étendue less than about 7 mm²·sr.

34. A system comprising:

a video unit capable of producing an output video signal; and a projection system, coupled to video unit, capable of receiving the video output signal and further capable of projecting video, said projection system comprising an illumination system comprising fist and second reflecting devices having respective first and second focal points, positioned such that the second focal points are substantially coincident, first and second arc lamps associated respectively with reflecting devices for producing respective first and second light rays, each arc lamp having an arc located at about the first focal point of the corresponding reflecting device, the illumination system further comprising a compound parabolic concentrator having input and output ends, the input end located at about the second focal point of the reflecting devices, said input end receiving light rays over a first range of acceptance angles and emitting light rays from the output end with a second range of angles the second range being smaller than the first ran e wherein the first light rays exit the compound parabolic concentrator with an étendue less than about 7 mm$^2$·sr;

a light valve optical arrangement optically coupled to the illumination system; and a projection lens optically coupled to the light valve optical arrangement.

35. The system of claim 34, wherein the video unit is selected from the group comprising a digital versatile disk player, video camera, and/or set-top box.

36. The system of claim 34, in which illumination system further comprises an optical integrator having an input aperture positioned to receive the light rays from the output end of the compound parabolic concentrator, and an output aperture from which the light rays exit with a substantially uniform brightness.

37. The system of claim 34, wherein the light valve optical arrangement comprises a liquid crystal on silicon light valve.

* * * * *